United States Patent
Kim et al.

(10) Patent No.: US 10,915,763 B2
(45) Date of Patent: Feb. 9, 2021

(54) METHOD AND APPARATUS WITH LANE DETERMINATION

(71) Applicant: Samsung Electronics Co., Ltd., Suwon-si (KR)

(72) Inventors: Jiyeon Kim, Hwaseong-si (KR); Minsu Ahn, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 16/272,347

(22) Filed: Feb. 11, 2019

(65) Prior Publication Data

US 2020/0104607 A1    Apr. 2, 2020

(30) Foreign Application Priority Data

Sep. 28, 2018  (KR) .................. 10-2018-0115854

(51) Int. Cl.
  *G06K 9/00*   (2006.01)
  *G06T 7/70*   (2017.01)
  *G06K 9/62*   (2006.01)

(52) U.S. Cl.
  CPC ....... *G06K 9/00798* (2013.01); *G06K 9/6218* (2013.01); *G06T 7/70* (2017.01); *G06T 2207/30256* (2013.01)

(58) Field of Classification Search
  CPC .... G06K 9/00798; G06K 9/6218; G06T 7/70; G06T 2207/30256
  See application file for complete search history.

(56) References Cited

U.S. PATENT DOCUMENTS

| 8,385,601 | B2 | 2/2013 | Kawasaki et al. |
| 2015/0278613 | A1* | 10/2015 | Takemae ............ G06K 9/00798 |
| | | | 382/104 |
| 2016/0046290 | A1* | 2/2016 | Aharony ............... B60W 10/04 |
| | | | 701/41 |
| 2018/0131924 | A1 | 5/2018 | Jung et al. |
| 2018/0134289 | A1 | 5/2018 | Kokido et al. |

FOREIGN PATENT DOCUMENTS

| KR | 10-2013-0142008 A | 12/2013 |
| KR | 10-2015-0070832 A | 6/2015 |

OTHER PUBLICATIONS

Nedevschi, S., et al., "Increased Accuracy Stereo Approach for 3D Lane Detection", *Intelligent Vehicles Symposium*, Jun. 13-15, 2006, pp. 42-49 (9 pages in English).

* cited by examiner

*Primary Examiner* — David F Dunphy
(74) *Attorney, Agent, or Firm* — NSIP Law

(57) ABSTRACT

Disclosed is a method and apparatus for determining a lane, the method including extracting plural straight-line segments from a captured stereo image including a first image and a second image of a driving road, selecting a first lane from the stereo image based on line segments of the plural straight-line segments, corresponding to lanes of the driving road, predicting a second lane candidate, based on the first lane, including at least a portion of a lane area excluding the line segments in the stereo image, and determining a second lane by updating a position of the predicted second lane candidate based on a confidence value of the predicted second lane candidate.

24 Claims, 10 Drawing Sheets

210

900

METHOD AND APPARATUS WITH LANE DETERMINATION

CROSS-REFERENCE TO RELATED APPLICATIONS

This application claims the benefit under 35 USC § 119(a) of Korean Patent Application No. 10-2018-0115854 filed on Sep. 28, 2018 in the Korean Intellectual Property Office, the entire disclosure of which is incorporated herein by reference for all purposes.

BACKGROUND

1. Field

The following description relates to a method and an apparatus with lane determination.

2. Description of Related Art

Three-dimensional (3D) information of a road surface may be used to generate information for an advanced driver assistant system (ADAS) and autonomous navigation. The 3D information of the road surface may be obtained by comparing left and right images acquired using a stereo camera, calculating a disparity, and estimating depth information of the entire area including the road surface based on the disparity.

However, in the case of estimating the depth information by calculating the disparity in the entire area, a long calculation time may be required. Also, when sparsely estimating a depth value due to an insignificant change in slope at the road surface, the calculation time may be saved, but a separate calculation process may be required to distinguish between a road and a non-road or lanes. In addition, it is not easy to predict a line or a lane when a portion of a road does not appear in an image due to an obstacle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of determining a lane includes extracting plural straight-line segments from a captured stereo image including a first image and a second image of a driving road, selecting a first lane from the stereo image based on line segments of the plural straight-line segments, corresponding to lanes of the driving road, predicting a second lane candidate, based on the first lane, including at least a portion of a lane area excluding the line segments in the stereo image, and determining a second lane by updating a position of the predicted second lane candidate based on a confidence value of the predicted second lane candidate.

The selecting of the first lane may include clustering line segments, of the plural straight-line segments, corresponding to a same lane of the driving road, and selecting the first lane based on the clustered line segments.

The predicting of the second lane candidate may include predicting the second lane candidate based on information on the driving road including the first lane.

The predicting of the second lane candidate may include predicting the second lane candidate through an extrapolation performed on line segments, of the plural line segments, corresponding to the first lane.

The predicting of the second lane candidate may include predicting the second lane candidate based on a normal direction of a determined gradient direction of a pixel intensity of the first lane.

The method may further include calculating the confidence value of the predicted second lane candidate.

The calculating of the confidence value may include calculating the confidence value of the predicted second lane candidate based on at least one of a gradient value of a pixel intensity of the predicted second lane candidate and a determined gradient direction of the pixel intensity of the predicted second lane candidate.

The calculating of the confidence value may include calculating the confidence value of the predicted second lane candidate based on a degree of curvature of the predicted second lane candidate relative to the first lane.

The calculating of the confidence value of the predicted second lane candidate based on the degree of curvature may include generating an extending line through an extrapolation performed on line segments corresponding to the first lane, calculating a degree of curvature of the predicted second lane candidate relative to the extending line, and determining a confidence value of the predicted second lane candidate based on the degree of curvature of the predicted second lane candidate.

The method may further include generating curves comprising a plurality of curve sections corresponding to each of a first line and a second line distinguishing the second lane.

The generating of the curves may include generating a first curve corresponding to the first line and a second curve corresponding to the second line based on the confidence value of the predicted second lane candidate.

The determining of the second lane may include finetuning curves including a plurality of curve sections corresponding to each of a first line and a second line distinguishing the second lane, and determining the second lane by updating the position of the predicted second lane candidate based on a disparity corresponding to a curve section of the plurality of curve sections in the stereo image.

The determining of the second lane by updating the position based on the disparity may include calculating the disparity corresponding to the curve section in the stereo image, adjusting a position of the curve section by correcting the disparity based on a confidence value corresponding to the curve section, and determining the second lane by updating a three-dimensional (3D) position of the predicted second lane candidate based on the adjusted position of the curve section.

The calculating of the disparity may include calculating a disparity between pixels at a same height of the first image and the second image.

The adjusting of the position of the curve section may include correcting the disparity between the pixels at the same height based on the confidence value corresponding to the curve section in each of the first image and the second image, and adjusting the position of the curve section based on a correction of the disparity.

The method may further include updating a confidence value corresponding to the curve section of which the position is adjusted.

The extracting of the plural straight-line segments may include acquiring the stereo image, extracting an edge area in the stereo image, and extracting the plural straight-line segments using the edge area.

A non-transitory computer-readable storage medium storing instructions that, when executed by a processor, cause the processor to perform the method above.

In another general aspect, an apparatus may include a sensor configured to capture a stereo image including a first image and a second image of a driving road, and one or more processors. The one or more processors are configured to select a first lane from the stereo image based on line segments corresponding to lanes of the driving road of plural straight-line segments extracted from the stereo image, predict a second lane candidate, based on the first lane, including a portion of a lane area excluding the line segments in the stereo image, and determine a second lane by updating a position of the predicted second lane candidate based on a confidence value of the predicted second lane candidate.

At least one of the one or more processors may be configured to fine-tune curves including a plurality of curve sections corresponding to each of a first line and a second line distinguishing the second lane, and determine the second lane by updating a position of the predicted second lane candidate based on a disparity corresponding to a curve section of the plurality of curve sections in the stereo image.

Other features and aspects will be apparent from the following detailed description, the drawings, and the claims.

Figure 1:
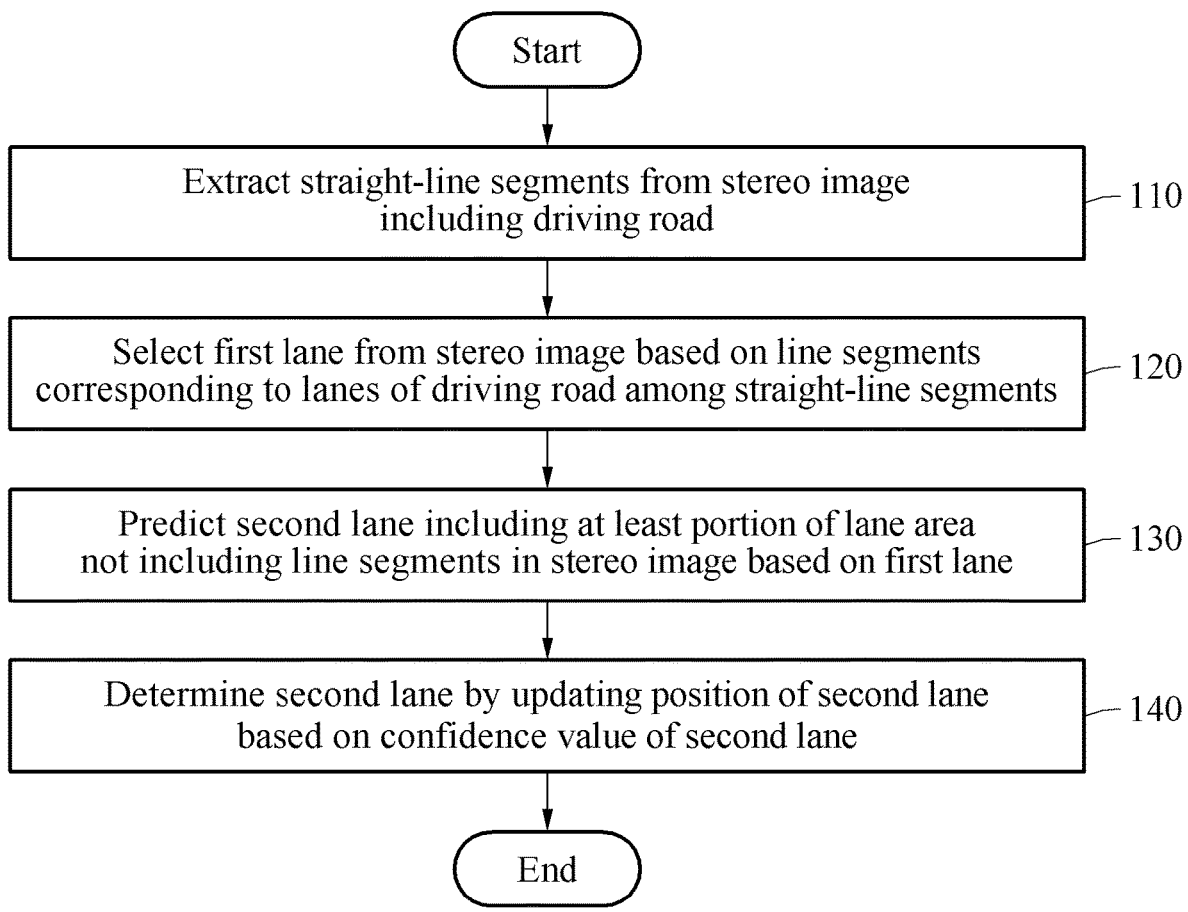
FIG. 1 illustrates an example of a method of determining a lane.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are understood hereby may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood to which this disclosure pertains and in view of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Hereinafter, the examples will be described in detail with reference to the accompanying drawings, wherein like drawing reference numerals are used for like elements.

FIG. 1 is a flowchart illustrating an example of a method of determining a lane. Referring to FIG. 1, an apparatus determining a lane (hereinafter, also be referred to as "determination apparatus") extracts straight-line segments from a stereo image of a driving road in operation 110. The stereo image may include a first image corresponding to a left image and a second image corresponding to a right image. The stereo image may be an image acquired from a capturing device included in the determination apparatus or an image captured by a device other than the determination apparatus. The capturing device may be fixed to a predetermined area such as a windshield, a dashboard, a rear-view mirror, and the like of the vehicle to capture the driving image in front of the vehicle. As a non-limiting example, the capturing device is a stereo camera. The capturing device includes, for example, a vision sensor, an image sensor, or a device performing a similar function. The capturing device may capture a single image and may also capture an image for each frame in various examples. The stereo image is, for example, a driving image including a driving road of a vehicle. The stereo image may be used as a background image or other image displayed together with a virtual object for augmented reality service embodiment. The driving road may include a road being driven or drivable by a vehicle. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The determination apparatus or system is, for example, a vehicle and/or a user device such as a GPS navigator, a smartphone and the like.

In operation 110, the determination apparatus acquires a stereo image from, for example, a camera and extracts an edge area in the stereo image. The determination apparatus extracts straight-line segments using the edge area. Here, "straight-line segments" may be segments corresponding to straight road lines of at least a predetermined or preset length extracted from the edge area. A method of extracting the straight-line segments from the stereo image using the determination apparatus will be further described with reference to FIG. 2.

In operation 120, the determination apparatus selects a first lane from the stereo image based on line segments of the straight-line segments extracted in operation 110 corresponding to lanes of the driving road. The determination apparatus clusters line segments of straight-line segments corresponding to the same lane of the driving road. The determination apparatus selects the first lane based on the clustered line segments. The first lane may be a driving lane of a host vehicle and may also be a lane adjacent to the driving road. A method of selecting the first lane using the determination apparatus will be further described with reference to FIG. 3.

In operation 130, based on the first lane selected in operation 120, the determination apparatus predicts a second lane including at least a portion of a lane area not including the line segments in the stereo image. Here, "at least a portion of a lane area not including line segments" may also be referred to herein as "necessary area" where a lane prediction may be required because the line segments are absent even when the necessary area is estimated to be a lane. For example, the necessary area may be an area from which the line segments are not accurately detected due to an invisible state in which a portion of a first line and/or a second line of a first lane in the stereo image is obscured by an obstacle and/or unidentifiable, or a saturation state in which the amount of light included in the corresponding image is greater than a preset reference. The determination apparatus may assume that a host vehicle is at a center of a lane, form a bounding box based on a pitch of the host vehicle, and predict a second lane corresponding to the necessary area based on the area in the bounding box. The second lane may be a partial area of a first lane, for example, the entire line area on either side of the first lane, and may be a partial line area on either side of the first lane. Also, the second lane may be a separate lane distinguished from the first lane.

The determination apparatus predicts the second lane based on information (for example, two-dimensional (2D) map information that may have been locally or remotely stored) on the driving road including the first lane. For example, the determination apparatus amy predict the second lane through an extrapolation performed on line segments corresponding to the first lane of the line segments. Also, the determination apparatus predicts the second lane by assuming that a lane is present in a normal direction of a gradient direction of a pixel intensity of the first lane. A method of predicting the second lane using the determination apparatus will be further described with reference to FIG. 4.

In operation 140, the determination apparatus determines the second lane by updating a position of the second lane based on a confidence value of the second lane. For example, the determination apparatus may calculate the confidence value of the second lane based on a gradient value of a pixel intensity of the second lane and/or a gradient direction of the pixel intensity of the second lane. A method of calculating the confidence value of the second lane using the determination apparatus will be further described with reference to FIG. 5.

The determination apparatus generates curves based on the confidence value of the second lane. The curves include a plurality of curve sections corresponding to each of a first line and a second line distinguishing the second lane. For example, left and right lines of a lane in which a host vehicle is located may be a solid line or a dashed line. When a line is the dashed line or a portion of the line is broken, the portion may be connected to another portion to be fitted as a single line, for example, a curve. In this example, a stereo image including a first image corresponding to a left image and a second image corresponding to a right image may be used. Line segments indicating one lane may be formed in one curve such that the left and right images can be recognized as the same driving image captured at the same time and position. The number of lines included in one lane is limited. As such, a process of forming (or connecting) the dashed line or the broken lanes as a single curve may be referred to as "curve fitting." In this example, a plurality of curve sections may each have a corresponding confidence value.

The determination apparatus generates a first curve corresponding to the first line and a second curve corresponding to the second line based on the confidence value of the second lane. The determination apparatus generates the first curve by clustering line segments having the same or substantially the same confidence value corresponding to a left-side lane distinguishing line of the second lane. Also, the determination apparatus generates the second curve by clustering line segments having the same or substantially the same confidence value corresponding to a right-side lane distinguishing line of the second lane.

The determination apparatus fine-tunes the curves. The determination apparatus determines the second lane by updating a position of the second lane based on the respective disparities of the plurality of curve sections in the stereo image. Here, the "disparity" may be an X-directional (horizontal) difference of pixels in the stereo image. The second lane determined in operation 140 includes three-dimensional (3D) lane information of a road in the stereo image. A method of determining the second lane using the determination apparatus will be described with reference to FIGS. 6 and 7.

Herein, the "vehicle" embodiment refers to a vehicle that may be driving on a road and includes, for example, an autonomous or automated driving vehicle, and an intelligent or smart vehicle equipped with an advanced driver assistance system (ADAS). The term "road" refers to a way on which vehicles drive, and includes various types of roads such as, for example, a highway, a national road, a local road, an expressway, and a motorway. The road includes one or more lanes. The term "lane" refers to a road space distinguished by lines marked on a surface of the road. A single lane is distinguished by left and right lines or boundary lines thereof. The term "line" refers to a road line and includes various types of lines, for example, solid lines, broken lines, curved lines, and zigzag lines marked in white, blue or yellow, for example, on the surface of the road. The line may correspond to a line on one side that distinguishes a single lane, and may also correspond to a pair of lines, for example, a left line and a right line that distinguish a single lane.

Examples set forth hereinafter may be used to display lines and/or lanes, generate visual information to control, perform, or assist steering of an autonomous vehicle, or generate various control information for driving in an augmented reality (AR) navigation system embodiment of a smart vehicle embodiment. The examples may be used to interpret visual information and assist safe and pleasant driving experience in a device that may be included in, is, or includes an intelligent system such as a head-up display (HUD) installed for driving assistance or fully autonomous driving of a vehicle. The examples may be, or be applied to, for example, an autonomous vehicle, an intelligent vehicle, a smart phone, and a mobile device.

Figure 2:
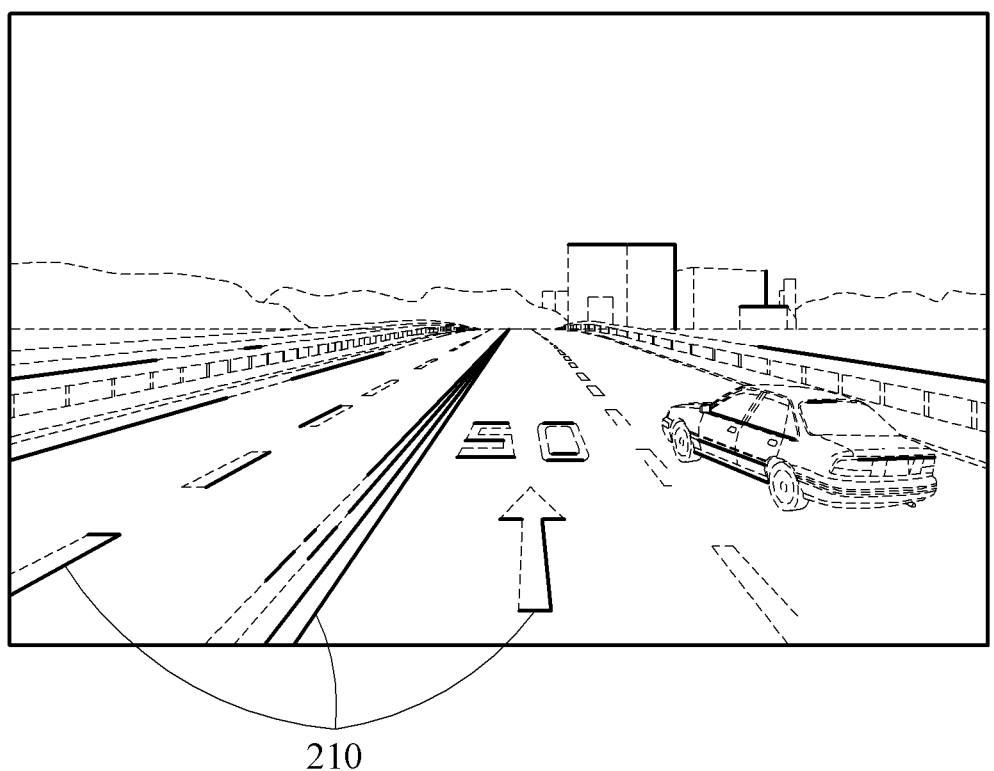
FIG. 2 illustrates an example of a method of extracting straight-line segments from a stereo image.

FIG. 2 is a diagram illustrating a method of extracting straight-line segments from a stereo image. FIG. 2 illustrates straight-line segments 210 extracted from an edge area of a stereo image. Hereinafter, although the following operation will be described as an operation performed in a stereo image for brevity of explanation, the operation may also be performed individually in a first image and a second image.

A determination apparatus acquires a stereo image and extracts an edge area in the stereo image. The determination apparatus extracts edge area(s) by performing edge search based on a feature point in the stereo image. The determination apparatus extracts the edge area(s) using, for example, a Canny edge detection method and a Hough transformation method. The determination apparatus extracts a straight line having at least a predetermined length from the edge area(s) as the straight-line segments 210. In this example, the straight-line segments 210 may include lines of various components such as straight and/or vertical components of a vehicle and straight and/or vertical components of a building in addition to a lane component.

Figure 3:
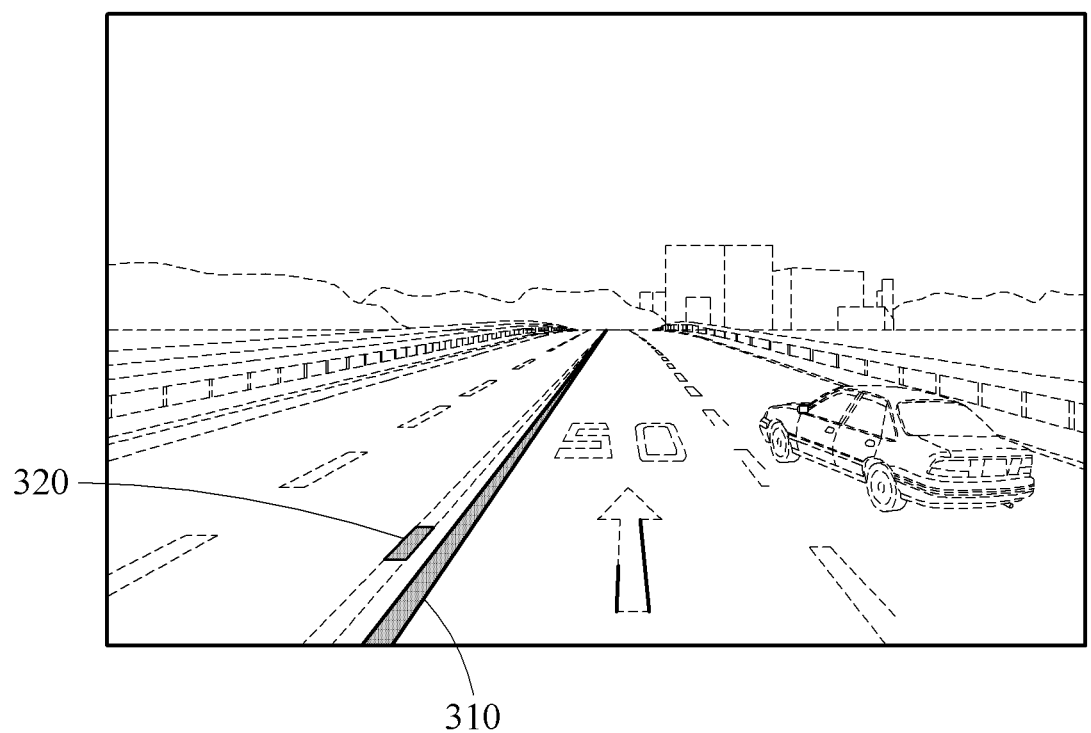
FIG. 3 illustrates an example of a method of selecting a first lane.

FIG. 3 is a diagram illustrating an example of a method of selecting a first lane. FIG. 3 illustrates first lanes 310 and 320 selected (or identified) from a stereo image. A process of selecting a first lane may correspond to a process of selecting line segments, from straight-line segments, corresponding to a lane component of a road surface.

The determination apparatus clusters line segments, of the extracted straight-line segments, that are determined to indicate the same lane of a driving road. For example, the determination apparatus clusters line segments indicating the same lane and/or the same line based on determined intervals between the line segments and the determined relationship between the angle viewed from a vehicle (a host vehicle) and the directivity (or a promoting direction) of the line segments. The determination apparatus clusters the line segments that indicate the same lane based on, for example, a determined relationship between a line extending from a vanishing point of the stereo image and the determined directivity of the line segments (e.g., whether the directivity of the line segments is coincident with the line extending from the vanishing point, etc.) or whether to be included in a bounding box based on the host vehicle. The determination apparatus selects at least one of the first lane 310, more particularly, in an example, the determination apparatus selects a first line and a second line of the first lane 310 based on the clustered line segments.

Figure 4:
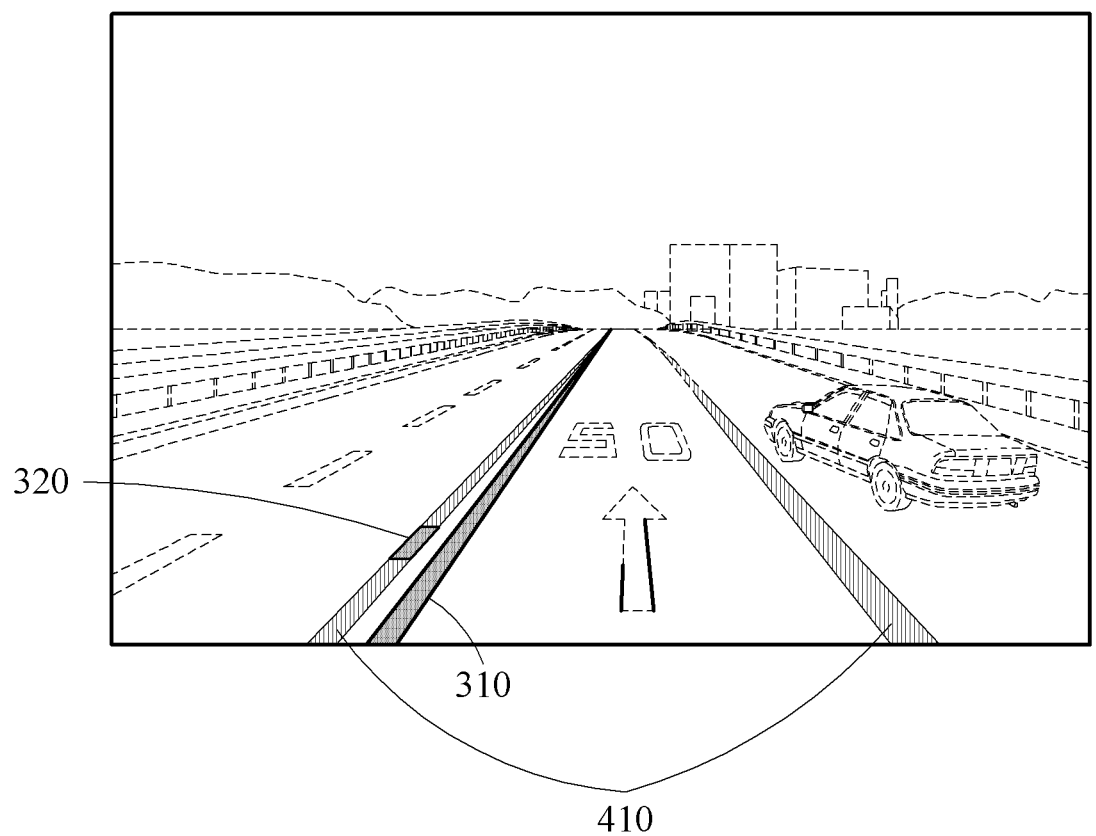
FIG. 4 illustrates an example of a method of predicting a second lane.

FIG. 4 is a diagram illustrating an example of a method of predicting a second lane. FIG. 4 illustrates a second lane 410 predicted by a determination apparatus, and first lanes, e.g., first lanes 310 and 320 selected in the example of FIG. 3, as non-limiting examples.

The determination apparatus predicts the second lane 410 based on information of a driving road that includes the first lanes 310 and 320. The information on the driving road is, for example, 2D map information corresponding to the driving road. The 2D map information corresponding to the driving road may include, for example, information of or indicating a lane width of the driving road, a line color, and a lane color. For example, a lane width may be 4 meters (m) when the driving road is a highway and a land width may be 3.5 m when the driving road is a typical road (i.e., not a highway). The determination apparatus acquires a lane width of the driving road based on map information on the driving road. For example, when the driving road is a typical road, the determination apparatus predicts that the second lane 410 (or at least one line of the second lane 410) is present at a position corresponding to a width of 3.5 m from a line of any one of the first lanes 310 and 320.

The determination apparatus may predict the second lane 410 by assuming that an unidentified line of the first lanes 310 and 320 is present in a normal direction of a gradient direction of a pixel intensity of the first lanes 310 and 320. For example, the determination apparatus generates a virtual line by assuming that a second line is present in the normal direction (a vertical direction) with respect to the gradient direction of a line of any one of the first lanes 310 and 320. In this example, the determination apparatus predicts the second lane 410 at a position corresponding to the lane width of the driving road in the normal direction of the gradient direction in consideration of the lane width of the driving road together with the gradient direction of the pixel intensity of the first lanes 310 and 320.

The determination apparatus may predict the second lane 410 by performing an extrapolation on line segments corresponding to the first lanes 310 and 320 among line segments. For example, the determination apparatus predicts the second lane 410 by extrapolating line segments included in a cluster of the first lanes 310 and 320. Here, "extrapolation" refers to a method of predicting a situation at a future time by extending a past trend line under the premise that a past trend will continue in the future. Through the extrapolation, the divergence of an error may increase as a function of distance from an increasing section point (for example, a lower portion of an image). The determination apparatus predicts the second lane 410 by filling an area not including the line segments in the first lanes 310 and 320 using an extending line of the line segments corresponding to the first lanes 310 and 320.

Figure 5:
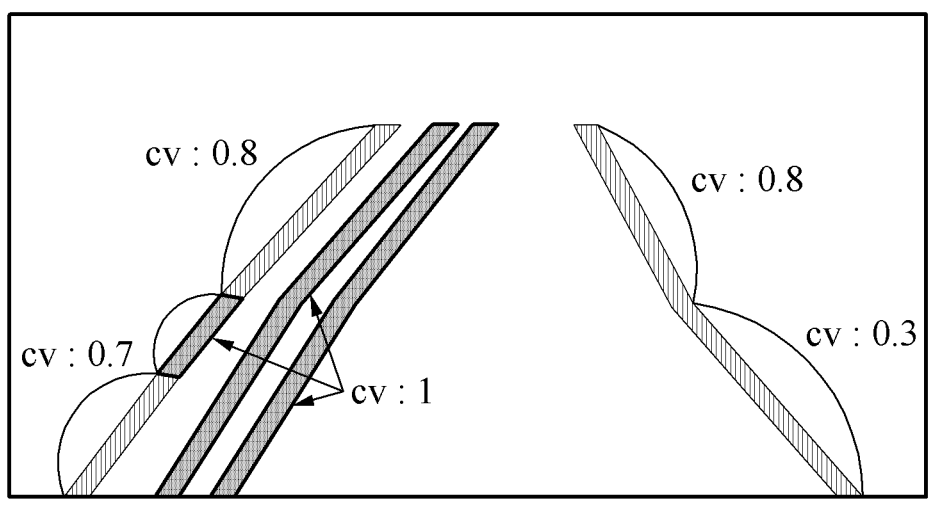
FIG. 5 illustrates an example of a method of calculating a confidence value of a second lane.

FIG. 5 is diagram illustrating an example of a method of calculating a confidence value of a second lane. FIG. 5 illustrates confidence values of the first lanes 310 and 320, as non-limiting example, and the second lane 410. In the example of FIG. 5, a process of calculating a confidence value (hereinafter, referred to as cv) corresponds to a process of calculating how reliable the second lane 410 predicted through the aforementioned process is, for example, the degree of likelihood of the predicted second lane 410 represents the confidence value. The confidence value of the second lane 410 calculated in the process may be used to calculate 3D information of a driving lane on a driving road.

The determination apparatus may calculate a confidence of the second lane 410 based on a degree of curvature of the second lane 410 relative to the first lanes 310 and 320. For example, the determination apparatus generates an extending line by performing an extrapolation on line segments corresponding to the first lanes 310 and 320. The determination apparatus may calculate a degree of curvature of the second lane 410 relative to an extending line of the first lanes 310 and 320, and determines the confidence of the second lane 410 based on the degree of curvature of the second lane 410. The determination apparatus may determine the extent of how much the second lane 410 is bent or curved about the extending line of the first lanes 310 and 320. The determination apparatus may determine the confidence value of the second lane 410 to be "1" when the extending line of the first lanes 310 and 320 and the second lane 410 are horizontal, and determine the confidence value to be a value less than "1" based on a function of increasing degree of curvature, e.g., sequence values of 0.8, 0.7, and 0.3 corresponding to a sequential increase in the degree of curvature.

The determination apparatus calculates the confidence value of the second lane 410 based on at least one of a gradient value of a pixel intensity of the second lane 410 and a gradient direction of the pixel intensity of the second lane 410. For example, may be assumed that the determination apparatus has a normal reference value of a slope intensity of pixels of a lane (or a line) over the entire driving road. The determination apparatus may calculate the confidence value of the second lane 410 by comparing the gradient value of the pixel intensity of the second lane 410 and/or the gradient direction of the pixel value of the second lane 410 to the normal reference value of the slope intensity of the pixels.

Figure 6:
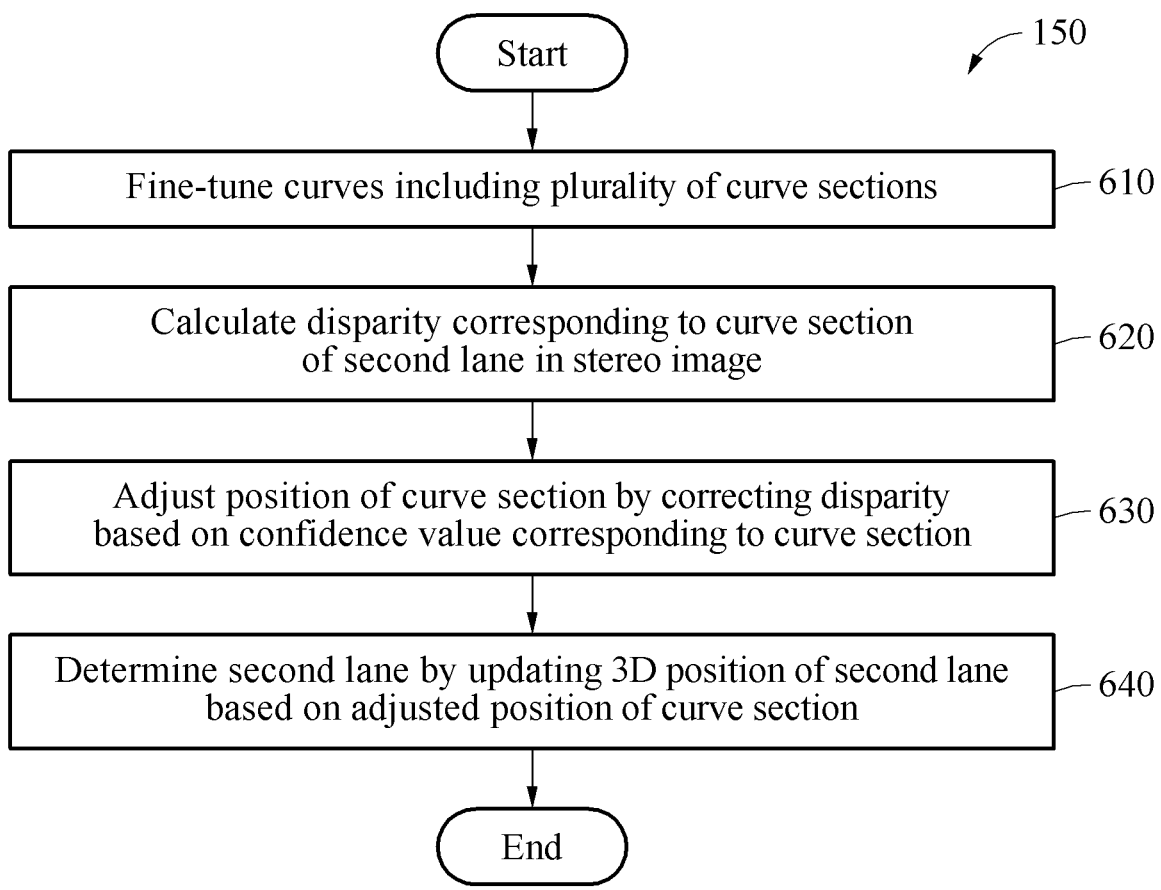
FIG. 6 illustrates an example of a method of determining a second lane.
Figure 7:
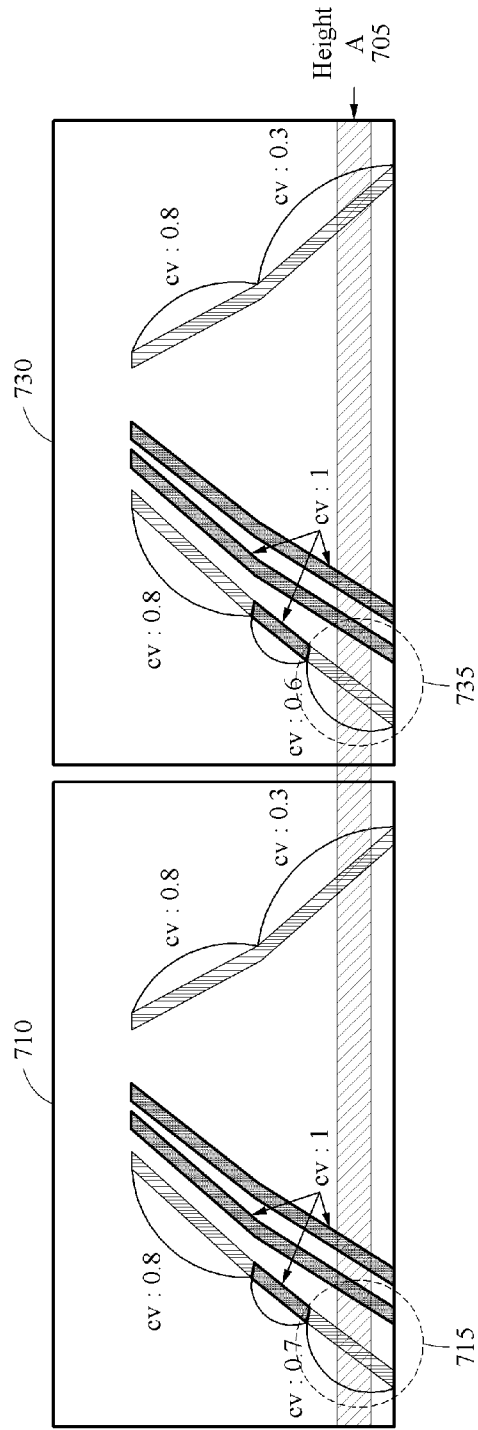
FIG. 7 illustrates an example of a method of determining a second lane.

FIG. 6 is a flowchart illustrating an example of a method of determining a second lane and FIG. 7 is a diagram illustrating an example of a method of determining a second lane.

Referring to FIGS. 6 and 7, in operation 610, a determination apparatus fine-tunes curves including a plurality of curve sections corresponding to each of a first line and a second line distinguishing a second lane. As described above, the determination apparatus may acquire a curve from each of a first image 710 and a second image 730 corresponding to a left image and a right image based on a lane. To increase the accuracy of the curve, the determination apparatus may perform fine-tuning based on a sub-pixel level, for example. In this example, a lower portion of a stereo image corresponds to a road area close to a vehicle (a host vehicle), for example, an area with a small depth value. An error of one pixel may be relatively small in the area with the small depth value. However, an upper portion of the stereo image corresponds to a road area far from the vehicle (the host vehicle), for example, an area with a large depth value. In the stereo image, a depth value gradually increases as a distance from the bottom increases, and thus the error of one pixel may also increase in proportion thereto. In an example, corresponding curves may be fine-tuned at the sub-pixel level based on the depth value in the stereo image.

In operation 620, the determination apparatus calculates a disparity corresponding to a curve section in the stereo image. The determination apparatus calculates a disparity between pixels at a same height A 705 from each of the first image 710 and the second image 730 in the stereo image. The determination apparatus calculates a disparity between curve sections indicating the same lane that is one of a left side and a right side of the lane in the stereo image. In this example, as a confidence value corresponding to the disparity between the pixels at the same height A 705, a confidence value of a curve (or a curve section) to which the pixels belong. Depending on an example, the determination apparatus may calculate a disparity for each curve section or calculate a disparity for each curve.

In operation 630, the determination apparatus adjusts a position of the curve section by correcting the disparity based on a determined or calculated confidence value corresponding to the curve section. The determination apparatus adjusts a position of a curve section by extending a corresponding disparity value based on the confidence value of the lane. For example, the determination apparatus may correct the disparity of the pixels at the same height A 704 based on the confidence value corresponding to the curve section in each of the first image 710 and the second image 730. As an example, the determination apparatus may compare, for example, a first confidence value (0.7) corresponding to a first curve section 715 of the first image 710 and a second confidence value (0.6) corresponding to a first curve section 735 of the second image 730.

In this example, the determination apparatus extends (applies) the disparity of the first curve section 715 of the first image 710 having a greater confidence value between the first confidence value (0.7) and the second confidence value (0.6), to the disparity of the first curve section 735 of the second image 730 having a less confidence value. For example, the determination apparatus adjusts the disparity of the pixels at the same height in the left image (the first image) 710 and the right image (the second image) 730 based on the confidence value. The determination apparatus may perform interpolation and/or extrapolation based on a disparity of a curve section of which a confidence value (cv) is "1" and corrects a disparity of a curve section of which a confidence value (cv) is less than "1." In this example, it is assumed that a normal of a road surface is insignificantly changed. In the first curve section 735 of the second image 730 having a low confidence value, the fine-tuning may be performed on a curve by performing a disparity prediction through a disparity extension of the first curve section 715 of the first image 710. In an example, the determination apparatus may assign different weights based on a confidence value for each curve section.

In operation 640, the determination apparatus determines the second lane by updating a 3D position of the second lane based on the adjusted position of the curve section. Since a 3D position of a lane has been changed due to disparity correction, the determination apparatus adjusts a position of a corresponding curve section of the second lane. In this example, the determination apparatus also updates the confidence value corresponding to the curve section at the adjusted position.

In an example, since 3D information of a road surface is extended after a disparity is calculated for sectional curves of left and right lines of a lane, it may also be applied to parts other than a specific lane used for the disparity.

Figure 8:
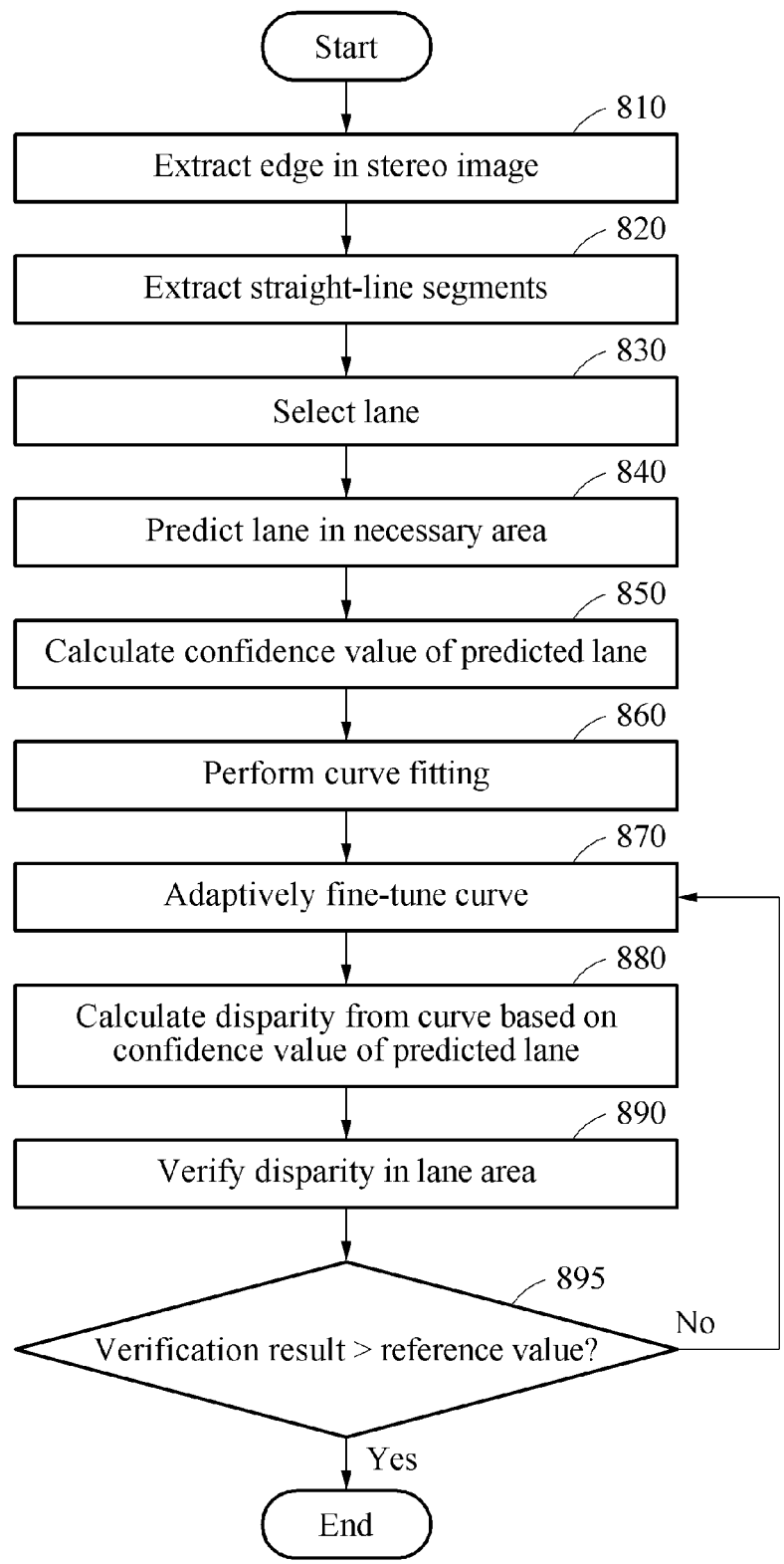
FIG. 8 illustrates an example of a method of determining a lane.

FIG. 8 is a flowchart illustrating an example of a method of determining a lane. Referring to FIG. 8, in operation 810, a determination apparatus extracts an edge in a stereo image. The determination apparatus acquires a stereo image including a left image and a right image acquired by capturing a driving road and extracts an edge area in the stereo image.

In operation 820, the determination apparatus extracts straight-line segments. The determination apparatus extracts the straight-line segments using the edge area extracted in operation 810.

In operation 830, the determination apparatus selects a lane (for example, the first lane). The determination apparatus selects the lane from the stereo image based on line segments corresponding to lanes of the driving road among the straight-line segments extracted in operation 820.

In operation 840, the determination apparatus predicts the lane in a necessary area. The determination apparatus predicts a lane (for example, the second lane) corresponding to the necessary area in the stereo image based on the first lane. Here, the necessary area is, for example, at least a portion of a lane area not including the line segments.

In operation 850, the determination apparatus calculates a confidence value of the lane (the second lane) predicted in operation 840.

In operation 860, the determination apparatus performs curve fitting. The determination apparatus generates curve(s) including a plurality of sections corresponding to left and right lines distinguishing the second lane based on the confidence value of the second lane.

In operation 870, the determination apparatus adaptively fine-tunes the curve(s).

In operation 880, the determination apparatus calculates a disparity from the curve(s) based on the confidence value of the lane (the second lane) predicted in operation 840. The determination apparatus calculates a disparity corresponding to a curve section of the second lane in the stereo image.

In operation 890, the determination apparatus verifies the disparity in the lane area. The determination apparatus verifies the disparity through a lane comparison in the left and right images at a sub-pixel level. The determination apparatus adjusts a position of the curve section by correcting the disparity based on the confidence value corresponding to the curve section and determines a 3D position of the second lane updated to correspond the adjusted curve section.

In operation 895, the determination apparatus compares a verification result obtained in operation 890 to a preset reference value. When an accuracy of the disparity verified in operation 890 is greater than the preset reference value, the determination apparatus terminates an operation. In contrast, when an accuracy of the disparity verified in operation 890 is less than or equal to the preset reference value, the determination apparatus repetitively performs operations 870 through 890 until the accuracy of the disparity is greater than the preset reference value.

Figure 9:
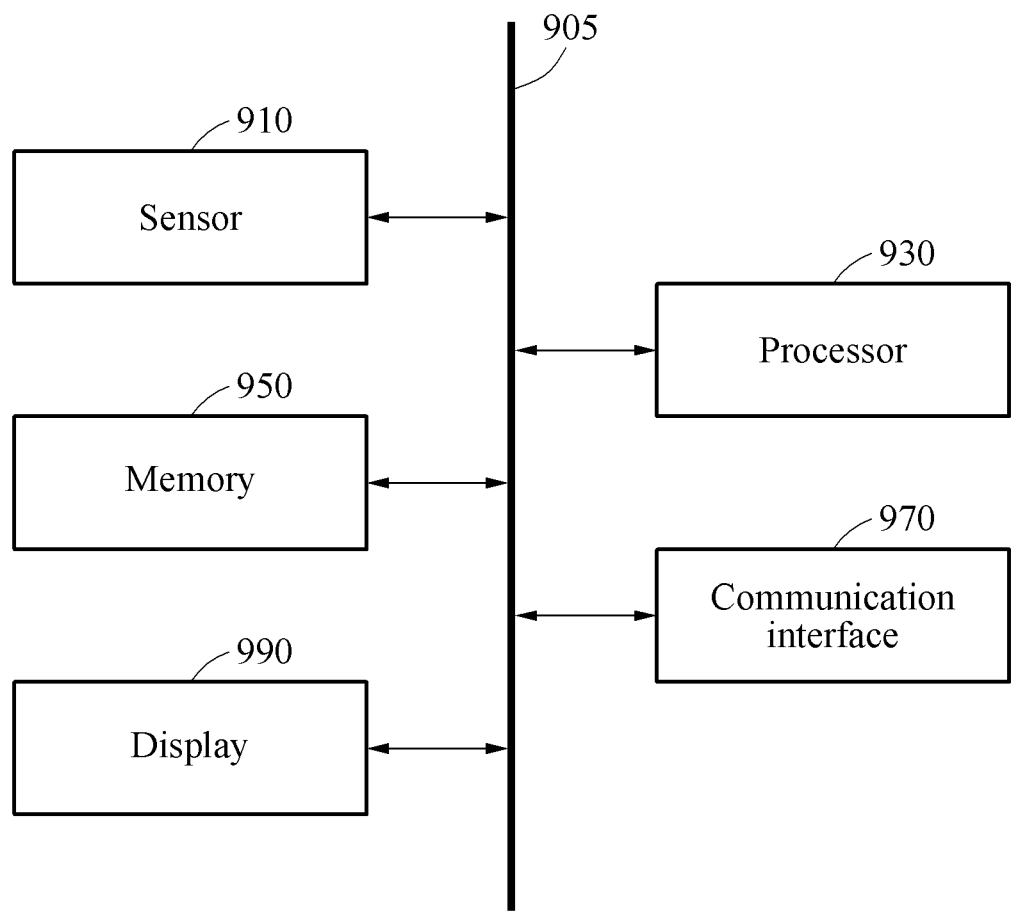
FIG. 9 illustrates an example of an apparatus for determining a lane.

FIG. 9 is a block diagram illustrating an apparatus for determining a lane. Referring to FIG. 9, a determination apparatus 900 includes a sensor 910 and a processor 930. The determination apparatus 900 may further include a memory 950, a communication interface 970, and a display 990. The sensor 910, the processor 930, the memory 950, the communication interface 970, and the display 990 may be connected to one another through a communication bus 905.

The sensor 910 captures a stereo image including a driving road. The sensor 910 is, for example, a stereo camera, an image sensor, or a vision sensor. The stereo image includes a left image and a right image acquired by capturing the driving road. The left image corresponds to a first image and the right image corresponds to a second image.

The processor 930, having acquired or received the stereo image, selects a first lane from the stereo image based on line segments corresponding to lanes of the driving road of straight-line segments extracted from the stereo image. The processor 930 predicts a second lane including at least a portion of a lane area not including the line segments in the stereo image based on the first lane. The processor 930 determines the second lane by updating a position of the second lane based on a confidence value of the second lane.

The processor 930 fine-tunes curves including a plurality of curve sections corresponding to each of a first line and a second line distinguishing the second lane. The processor 930 determines the second lane by updating a position of the second lane based on a disparity corresponding to a curve section of the plurality of curve sections in the stereo image.

The processor 930 determines a position of a virtual object based on the determined second lane and controls the display of an image including the virtual object on the display 990.

The processor 930 may be a single processor or a plurality of processors.

The memory 950 stores information of the first lane, the second lane, the line segments, the straight-line segments extracted by the processor 930 and/or the stereo image. The memory 950 stores the confidence value of the second lane calculated by the processor 930. The memory 950 stores the position of the second lane updated by the processor 930 and/or the second lane determined by the processor 930.

The memory 950 stores various information generated during a processing operation of the processor 930. Also, the memory 950 stores a variety of data and programs. The memory 950 includes a volatile memory or a non-volatile memory. The memory 950 includes a large-capacity storage medium such as a hard disk to store the variety of data.

The communication interface 970 may output the second lane determined by the processor 930. In an example, the determination apparatus 900 may acquire sensing information including an input image from various sensors through the communication interface 970. In another example, the communication interface 970 may receive sensing information including a driving image from other sensors located external to the determination apparatus 900.

The display 990 may display the second lane determined by the processor 930 and the stereo image separately or together.

The processor 930 may output (a position of) the determined second lane through the communication interface 970 and/or the display 990 or control a virtual object together with the input image to be displayed on map data based on the position of the second lane, thereby providing an augmented reality service. Also, the processor 930 performs at least one of the methods described with reference to FIG. 1 through 8 or an algorithm corresponding to at least one of the methods.

The term "processor," as used herein, is a hardware-implemented data processing device having a circuit that is physically structured to execute desired operations. For example, the desired operations include code or instructions included in a program. The hardware-implemented data processing device includes, but is not limited to, for example, a microprocessor, a central processing unit (CPU), a processor core, a multi-core processor, a multiprocessor, an application-specific integrated circuit (ASIC), and a field-programmable gate array (FPGA). The processor 930 executes a program and controls the determination apparatus 900. Codes of the program executed by the processor 930 are stored in the memory 950.

In an example, the determination apparatus 900 is used to correct or update 3D location information of a lane on, for example, HUD or AR glass embodiments.

Figure 10:
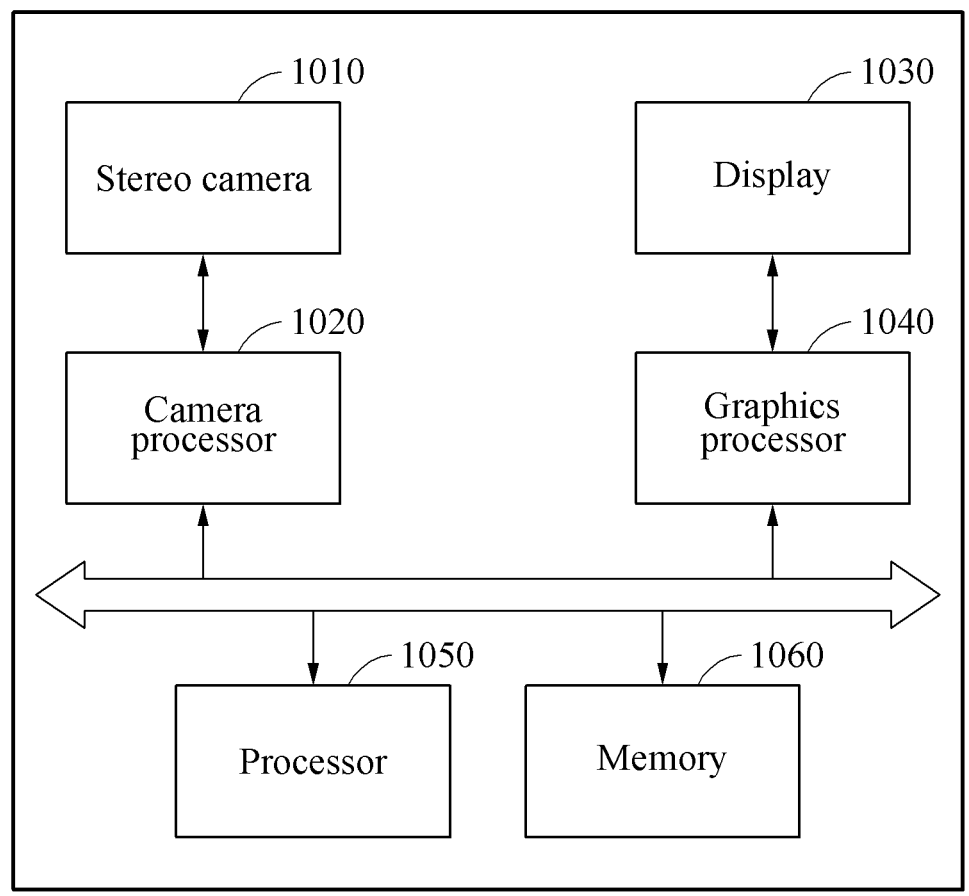
FIG. 10 illustrates an example of an apparatus for determining a lane.

FIG. 10 is a block diagram illustrating an example of an apparatus for determining a lane. Referring to FIG. 10, operations of a determination apparatus 1000 are implemented by a plurality of processors. The determination apparatus 1000 includes a stereo camera 1010, a camera processor 1020, a display 1030, a graphics processor 1040, a processor 1050, and a memory 1060. The stereo camera 1010, the camera processor 1020, the display 1030, the graphics processor 1040, the processor 1050, and the memory 1060 may communicate with one another through a communication bus 1005.

The stereo camera 1010 captures a stereo image including a driving road. The camera processor 1020 enables the stereo image to be captured with increased clarity and accuracy based on an intrinsic parameter and an extrinsic parameter of the stereo camera 1010.

The display 1030 displays an image processed by the graphics processor 1040. The image processed by the graphics processor 1040 may be an image of an augmented reality service embodiment. The graphics processor 1040 determines a position of a virtual object (for example, a driving guide arrow) based on a position of a lane (a second lane) determined by the processor 1050 and displays the virtual object in a background image, thereby generating the image for augmented reality service.

The processor 1050 selects a first lane from the stereo image including the driving road and predicts (or generates) a second lane including the a portion of a lane area in which a lane is not recognized in the stereo image based on the selected first lane. The processor 1050 determines the second lane by updating a position of the second lane based on a confidence value of the second lane. The processor 1050 may perform at least a portion of or all the aforementioned operations of the processor 930.

The memory 1060 stores the image generated by the graphics processor 1040 for the augmented reality service in addition to the second lane and the position of the second lane predicted by the processor 1050. Also, the memory 1060 stores a processing result of the camera processor 1020.

The respective determination apparatuses, determination apparatus 900, the sensor 910, the processor 930, the memory 950, the communication interface 970, and the display 990, the determination apparatus 1000, the stereo camera 1010, the camera processor 1020, the display 1030, the graphics processor 1040, the processor 1050, the memory 1060, and the communication bus 1005, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:

extracting plural straight-line segments from a captured stereo image including a first image and a second image of a driving road;

selecting a first lane from the stereo image based on line segments of the plural straight-line segments, corresponding to lanes of the driving road;

predicting a second lane candidate, based on the first lane, including at least a portion of a lane area excluding the line segments in the stereo image; and determining a second lane by updating a position of the predicted second lane candidate based on a confidence value of the predicted second lane candidate and a disparity corresponding to a curve section of a plurality of curve sections in the stereo image, wherein the plurality of curve sections are curve sections that correspond to each of a first line and a second line distinguishing the second lane from the first lane.

2. The method of claim 1, wherein the selecting of the first lane comprises:

clustering line segments, of the plural straight-line segments, corresponding to a same lane of the driving road; and selecting the first lane based on the clustered line segments.

3. The method of claim 1, wherein the predicting of the second lane candidate comprises:

predicting the second lane candidate based on information on the driving road including the first lane.

4. The method of claim 1, wherein the predicting of the second lane candidate comprises:

predicting the second lane candidate through an extrapolation performed on line segments, of the plural line segments, corresponding to the first lane.

5. The method of claim 1, further comprising:

calculating the confidence value of the predicted second lane candidate.

6. The method of claim 1, further comprising:

generating curves comprising a plurality of curve sections corresponding to each of a first line and a second line distinguishing the second lane.

7. The method of claim 6, wherein the generating of the curves comprises:

generating a first curve corresponding to the first line and a second curve corresponding to the second line based on the confidence value of the predicted second lane candidate.

8. The method of claim 1, wherein the extracting of the plural straight-line segments comprises:

acquiring the stereo image;

extracting an edge area in the stereo image; and extracting the plural straight-line segments using the edge area.

9. A non-transitory computer-readable storage medium storing instructions that, when executed by a processor, cause the processor to perform the method of claim 1.

10. The method of claim 1, wherein the predicting of the second lane candidate comprises:

predicting the second lane candidate based on a normal direction of a determined gradient direction of a pixel intensity of the first lane.

11. The method of claim 1, further comprising:

calculating the confidence value of the predicted second lane candidate based on at least one of a gradient value of a pixel intensity of the predicted second lane candidate and a determined gradient direction of the pixel intensity of the predicted second lane candidate.

12. The method of claim 1, further comprising:
calculating the confidence value of the predicted second lane candidate based on a degree of curvature of the predicted second lane candidate relative to the first lane.

13. An apparatus, the apparatus comprising:
a sensor configured to capture a stereo image including a first image and a second image of a driving road; and
one or more processors configured to:
select a first lane from the stereo image based on line segments corresponding to lanes of the driving road of plural straight-line segments extracted from the stereo image;
predict a second lane candidate, based on the first lane, including a portion of a lane area excluding the line segments in the stereo image and based on a normal direction of a determined gradient direction of a pixel intensity of the first lane; and
determine a second lane by updating a position of the predicted second lane candidate based on a confidence value of the predicted second lane candidate.

14. The method of claim 1, wherein the curves of the plurality of curves are fine-tuned curves.

15. The method of claim 1, wherein the determining of the second lane by updating the position based on the disparity comprises:
calculating the disparity corresponding to the curve section in the stereo image;
adjusting a position of the curve section by correcting the disparity based on a confidence value corresponding to the curve section; and
determining the second lane by updating a three-dimensional (3D) position of the predicted second lane candidate based on the adjusted position of the curve section.

16. The method of claim 15, wherein the calculating of the disparity comprises:
calculating a disparity between pixels at a same height of the first image and the second image.

17. The method of claim 16, wherein the adjusting of the position of the curve section comprises:
correcting the disparity between the pixels at the same height based on the confidence value corresponding to the curve section in each of the first image and the second image; and
adjusting the position of the curve section based on a correction of the disparity.

18. The method of claim 17, further comprising:
updating a confidence value corresponding to the curve section of which the position is adjusted.

19. A processor-implemented method, the method comprising:
extracting plural straight-line segments from a captured stereo image including a first image and a second image of a driving road;
selecting a first lane from the stereo image based on line segments of the plural straight-line segments, corresponding to lanes of the driving road;
predicting a second lane candidate, based on the first lane, including at least a portion of a lane area excluding the line segments in the stereo image and based on a normal direction of a determined gradient direction of a pixel intensity of the first lane; and
determining a second lane by updating a position of the predicted second lane candidate based on a confidence value of the predicted second lane candidate.

20. A processor-implemented method, the method comprising:
extracting plural straight-line segments from a captured stereo image including a first image and a second image of a driving road;
selecting a first lane from the stereo image based on line segments of the plural straight-line segments, corresponding to lanes of the driving road;
predicting a second lane candidate, based on the first lane, including at least a portion of a lane area excluding the line segments in the stereo image;
calculating a confidence value of the predicted second lane candidate based on at least one of a gradient value of a pixel intensity of the predicted second lane candidate and a determined gradient direction of the pixel intensity of the predicted second lane candidate; and
determining a second lane by updating a position of the predicted second lane candidate based on the confidence value of the predicted second lane candidate.

21. A processor-implemented method, the method comprising:
extracting plural straight-line segments from a captured stereo image including a first image and a second image of a driving road;
selecting a first lane from the stereo image based on line segments of the plural straight-line segments, corresponding to lanes of the driving road;
predicting a second lane candidate, based on the first lane, including at least a portion of a lane area excluding the line segments in the stereo image;
calculating the confidence value of the predicted second lane candidate based on a degree of curvature of the predicted second lane candidate relative to the first lane; and
determining a second lane by updating a position of the predicted second lane candidate based on the confidence value of the predicted second lane candidate.

22. The method of claim 21, wherein the calculating of the confidence value of the predicted second lane candidate based on the degree of curvature comprises:
generating an extending line through an extrapolation performed on line segments corresponding to the first lane;
calculating a degree of curvature of the predicted second lane candidate relative to the extending line; and
determining a confidence value of the predicted second lane candidate based on the degree of curvature of the predicted second lane candidate.

23. An apparatus, the apparatus comprising:
a sensor configured to capture a stereo image including a first image and a second image of a driving road; and
one or more processors configured to:
select a first lane from the stereo image based on line segments corresponding to lanes of the driving road of plural straight-line segments extracted from the stereo image;
predict a second lane candidate, based on the first lane, including a portion of a lane area excluding the line segments in the stereo image; and
determine a second lane by updating a position of the predicted second lane candidate based on a confidence value of the predicted second lane candidate and a disparity corresponding to a curve section of a plurality of curve sections in the stereo image, wherein the plurality of curve sections are curve sections that correspond to each of a first line and a second line distinguishing the second lane from the first lane.

24. The apparatus of claim 23, wherein the curves of the plurality of curves are fine-tuned curves.

* * * * *